United States Patent
Beyda et al.

[11] Patent Number: 6,160,881
[45] Date of Patent: Dec. 12, 2000

[54] SYSTEM AND METHOD FOR INTEGRATING ELECTRONIC ENTRY SYSTEMS WITH TELECOMMUNICATION SYSTEMS

[75] Inventors: William Joseph Beyda, Cupertino; Shmuel Shaffer, Palo Alto, both of Calif.

[73] Assignee: Siemens Information and Communication Networks, Inc., Boca Raton, Fla.

[21] Appl. No.: 08/980,612

[22] Filed: Dec. 1, 1997

Related U.S. Application Data

[63] Continuation-in-part of application No. 08/796,170, Feb. 6, 1997, Pat. No. 5,901,211, which is a continuation-in-part of application No. 08/716,116, Sep. 19, 1996, Pat. No. 5,802,147.

[51] Int. Cl.[7] ..................................................... H04M 3/42
[52] U.S. Cl. ........................................ 379/209; 379/90.01
[58] Field of Search ............................... 379/88.25, 88.26, 379/102.01, 102.06, 202, 203, 204, 205, 209, 90.01, 93.01; 455/412, 456, 457, 458, 459, 460; 340/286.07, 286.08, 825.31, 825.34

[56] References Cited

U.S. PATENT DOCUMENTS

| | | | |
|---|---|---|---|
| 4,275,385 | 6/1981 | White | 340/312 |
| 4,313,035 | 1/1982 | Jordan et al. | 179/18 |
| 4,601,064 | 7/1986 | Shipley | 455/608 |
| 4,752,951 | 6/1988 | Konneker | 379/211 |
| 5,349,636 | 9/1994 | Irribarren | 379/89 |
| 5,414,759 | 5/1995 | Ishikuri et al. | 379/88 |
| 5,822,418 | 10/1998 | Yacenda et al. | 379/201 |

OTHER PUBLICATIONS

U.S. Patent Application Serial No. 08/716,116, entitled "System and Method for Notifying a User of Awaiting Messages," William J. Beyda and Shmuel Shaffer, filed Sep. 19, 1996.

U.S. Patent Application Serial No. 08/796,170, entitled "System and Method for Automatically Transferring Calls or Allowing Access," Matthew T. Dean et al., filed Feb. 6, 1997.

*Primary Examiner*—Scott L. Weaver

[57] ABSTRACT

A system for integrating electronic location indicating systems (e.g., electronic door lock systems) with telecommunication systems (e.g., a PBX). This integrating of systems is done to improve the performance of a telecommunication feature, such as the camp-on feature. An electronic system is used to transmit a signal indicating information related to the user's location. A telecommunication system then receives the signal from the electronic system. This telecommunication system is capable of providing the telecommunication feature (e.g., the camp-on feature). The telecommunication system uses the signal from the electronic system as an input to the telecommunication feature.

20 Claims, 3 Drawing Sheets

SYSTEM AND METHOD FOR INTEGRATING ELECTRONIC ENTRY SYSTEMS WITH TELECOMMUNICATION SYSTEMS

CROSS REFERENCE TO RELATED APPLICATION

This application is a continuation-in-part of U.S. patent application Ser. No. 08/796,170, filed Feb. 6, 1997 now U.S. Pat. No. 5,901,211, which is a continuation-in-part of U.S. patent application Ser. No. 08/716,116, filed Sep. 19, 1996 now U.S. Pat. No. 5,802,147, which is incorporated herein by reference in its entirety for all purposes.

BACKGROUND OF THE INVENTION

1. Field of the Invention

The invention relates to integrating an electronic entry system with a telecommunication system, and more particularly to attempting to contact a user via a telecommunication system when a signal from an electronic entry system is received.

2. Description of the Related Art

Telecommunication systems employing various telecommunication features are common and readily available. For example, the camp-on feature (or callback request feature) is a telecommunication feature widely in use. The camp-on feature is usually utilized when a called party's telephone is in use (e.g., when an extension is busy, ringing, or in the do-not-disturb mode). When the caller realizes the called party's telephone is not available, the caller can initiate the camp-on feature. The telecommunication system then monitors the called party's telephone. Typically, the telecommunication system monitors whether the called party's telephone is ringing and/or is on-hook or off-hook. In one example, when the called party's telephone becomes available (e.g., the called party hangs up the telephone such that it is on-hook), the telecommunication system automatically sends a signal which rings the called party's telephone. This is referred to as the camp-on callback. If the called party then answers the telephone, the telecommunication system automatically sends a signal which rings the caller's telephone with a special, distinctive ring (e.g., triple rings). This special ring indicates to the caller that the camp-on feature is in use and the called party is on the line. If the caller then answers the telephone, the called party and the caller are connected. If the caller does not answer the telephone, the call is not completed. In another example, the telecommunication system still monitors the called party's telephone, but the caller is notified first when the called party's telephone becomes available. If the caller responds to the notification (e.g., by picking up the telephone receiver when a triple ring occurs), then a call is automatically placed to the called party by the telecommunication system. Again, this is referred to as a callback. There are still other implementations of this telecommunication feature. For example, the caller may have to wait on the line (i.e., leave the telephone off-hook) during the camp-on while the telecommunication system is monitoring the availability of the called party's telephone.

The currently available camp-on features have shortcomings. Usually, a caller attempts to camp on a called party's telephone because the called party is on the telephone. If the called party hangs up the telephone and then immediately leaves the area (e.g., an office or a hotel room), then the camp-on callback may not come through in time for the called party to hear it. Alternatively, after completing a call, the called party may immediately begin using their telephone again (e.g., to place another call or check voice mail) before the camp-on callback can be placed. Therefore, under these circumstances, using the camp-on feature to provide the connection between the caller and the called party is either delayed or prevented. In any of these examples, the camp-on feature requires the two users to stay near their telephones, not use their telephones, and wait after hanging up (e.g., ten seconds) before doing anything else (i.e., leaving the area or making another telephone call).

Some camp-on features will retry with a callback after a called party places another call and then terminates it. In this example, the telecommunication system monitors the called party's telephone for use. After the called party's telephone has gone off-hook and then on-hook, the caller is notified or the callback is placed. This is deficient because users sometimes return to their office or hotel room and do not place a call for an extended period of time or leave before placing a call. Thus, an opportunity to connect the call may be missed. Alternatively, the system may set a timer and retry the callback at various intervals. This wastes resources when the called party is absent for an extended period of time. Again, opportunities to connect the call may be missed if the called party returns and then leaves between callbacks which are on a timer.

Electronic door lock systems are also common. Many businesses employ both electronic door lock systems and telecommunication systems with the camp-on feature. Hotels also often have both electronic door lock systems and telecommunication systems. These electronic door lock systems receive input from a user via, for example, an electronic badge or an electronic key. Th badge/key is usually inserted into an electronic receiving device. The electronic receiving device is connected to a central computer which is part of the electronic door lock system. Thus, the central computer tracks when a user provides the correct input for access.

It is desirable to provide an intelligent interconnection between telecommunication systems and door lock systems to improve the communication between users. More particularly, it is desirable to improve the functionality of the camp-on operation. Monitoring only whether the called party's telephone is on-hook or off-hook is not the optimal method for indicating a called party's presence.

SUMMARY OF THE INVENTION

According to the invention, a system for integrating electronic location indicating systems (e.g., electronic door lock systems) with telecommunication systems (e.g., a PBX). This integrating of systems is done to improve the performance of a telecommunication feature, such as the camp-on feature. An electronic system is used to transmit a signal indicating information related to the user's location. A telecommunication system then receives the signal from the electronic system. This telecommunication system is capable of providing the telecommunication feature (e.g., the camp-on feature). The telecommunication system uses the signal from the electronic system as an input to the telecommunication feature. In the preferred embodiment, the telecommunication feature takes action based on this signal which indicates the user's location.

DETAILED DESCRIPTION

The present invention provides an apparatus and a method for connecting a telecommunication system with an electronic entry system. The telecommunication system can be utilized to provide communication between users in many different ways including telephone/voice, video, e-mail, facsimile and the like. The electronic entry system can be located in various environments. For example, the already existing electronic door lock systems in businesses and in hotels can be utilized. The electronic door lock system can also be installed in other environments (e.g., in residential homes). In the present invention, the electronic door lock system along with the telephone on-hook/off-hook status is used to initiate a telecommunication feature (e.g., the camp-on notification/callback feature). Thus, when, for example, the camp-on feature has been initiated, the called party's telephone is on-hook and the called party uses the electronic door lock system, the telecommunication system causes the called party's telephone to ring and/or notifies the caller. Additionally, time-limits can be placed on the camp-on to avoid disturbing a called party during off-hours.

Figure 1:
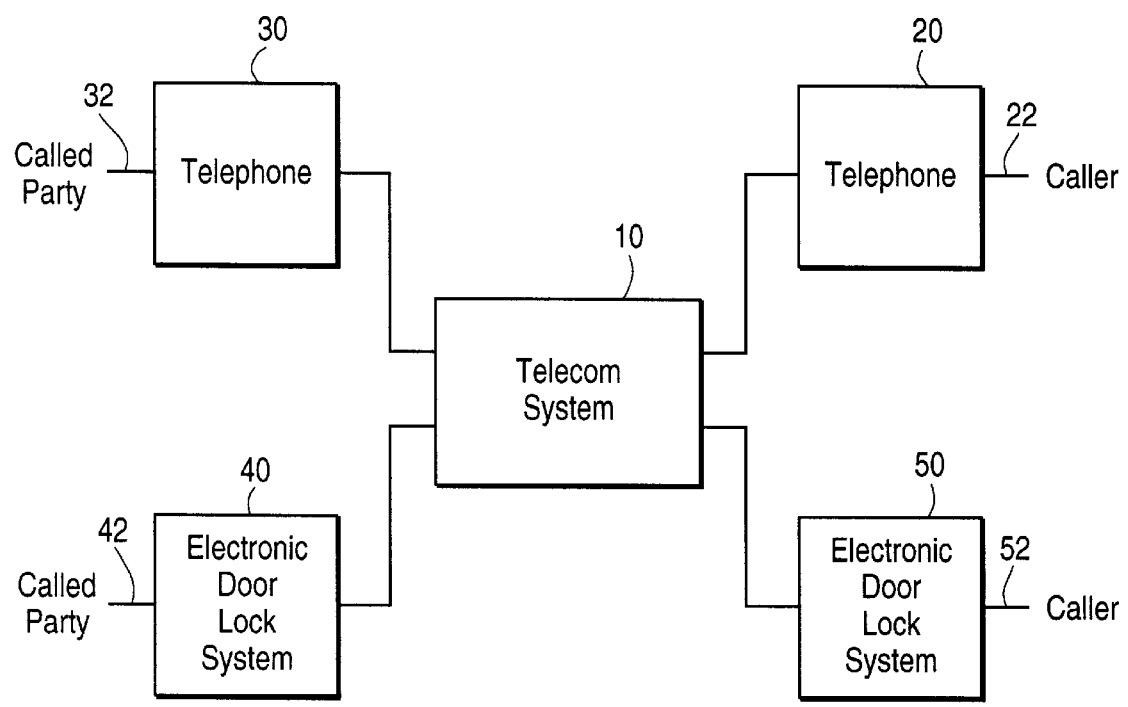
FIG. 1 illustrates the present invention in a business or a hotel environment.

In one embodiment of the invention, the electronic door lock system is located in a business environment. In another embodiment, the electronic door lock system is in a hotel environment. FIG. 1 illustrates the present invention in a business or a hotel environment. Telecommunication system 10 can be, for example, a private branch exchange (PBX) or a central office (CO). Telephone 20 is connected to telecommunication system 10 and has access to the caller shown by line 22. Similarly, telephone 30 is connected to telecommunication system 10 and has access to the called party shown by line 32. Electronic door lock system 40 is also connected to telecommunication system 10 and has access to the called party via input 42. Input 42 can be, for example, an input for inserting an electronic badge or key. Electronic door lock system 50 is an optional system which is connected to telecommunication system 10 and has access to the caller via input 52. Electronic door lock system 50 is not required for this embodiment of the invention.

In a business environment, electronic office door locks are sometimes utilized to provide access to employees. In the present invention, a connection is provided between the electronic office door locks and the telecommunication system. As set forth above, many businesses already have electronic office door locks which track each employee's arrival (or other) time. These systems usually include a central computer for tracking the time of arrival and/or departure. After the central computer is connected to the telecommunication system, the central computer or the telecommunication system can be utilized to implement the present invention. In the preferred embodiment, the central computer detects when a user has entered a room, and a signal is then sent to the telecommunication system. The telecommunication system checks for an initiated camp-on feature and evaluates the possibility of contacting the called party. The possibility of contacting the caller is also checked if electronic door lock system 50 is available. The implementation for the hotel environment can be done in the same manner.

In this example, telephone 30 could be located in either a business or a hotel. As soon as the called party uses an electronic badge or key to enter their office or room, telecommunication system 10 receives an input signal from electronic door lock system 40. The telecommunication system then checks the status of the called party's telephone (ringing, on-hook or off-hook). Camp-on callback is then automatically initiated by telecommunication system 10 if telephone 30 is not ringing and is on-hook.

The present invention can also be applied to both sides of a possible connection. In this example, telecommunication system 10 receives signals from both electronic door look system 40 and electronic door lock system 50. After a camp-on is initiated, telecommunication system 10 monitors the signals from both door lock systems 40, 50 until the signals indicate that both the caller and the called party are near telephones 20, 30. The callback is then placed.

If telephone 30 and electronic door system 40 are connected to a digital PBX that utilizes ISDN lines, then the caller can camp-on to telephone 30 even if telephone 30 is located in another country. This is possible because ISDN supports transmission of a callback request over the signaling channel. The user's PBX provides the request over the ISDN data channel (i.e., D-channel). The request is then transmitted over the ISDN signaling network where it is delivered to the remote PBX over the data channel.

Figure 2:
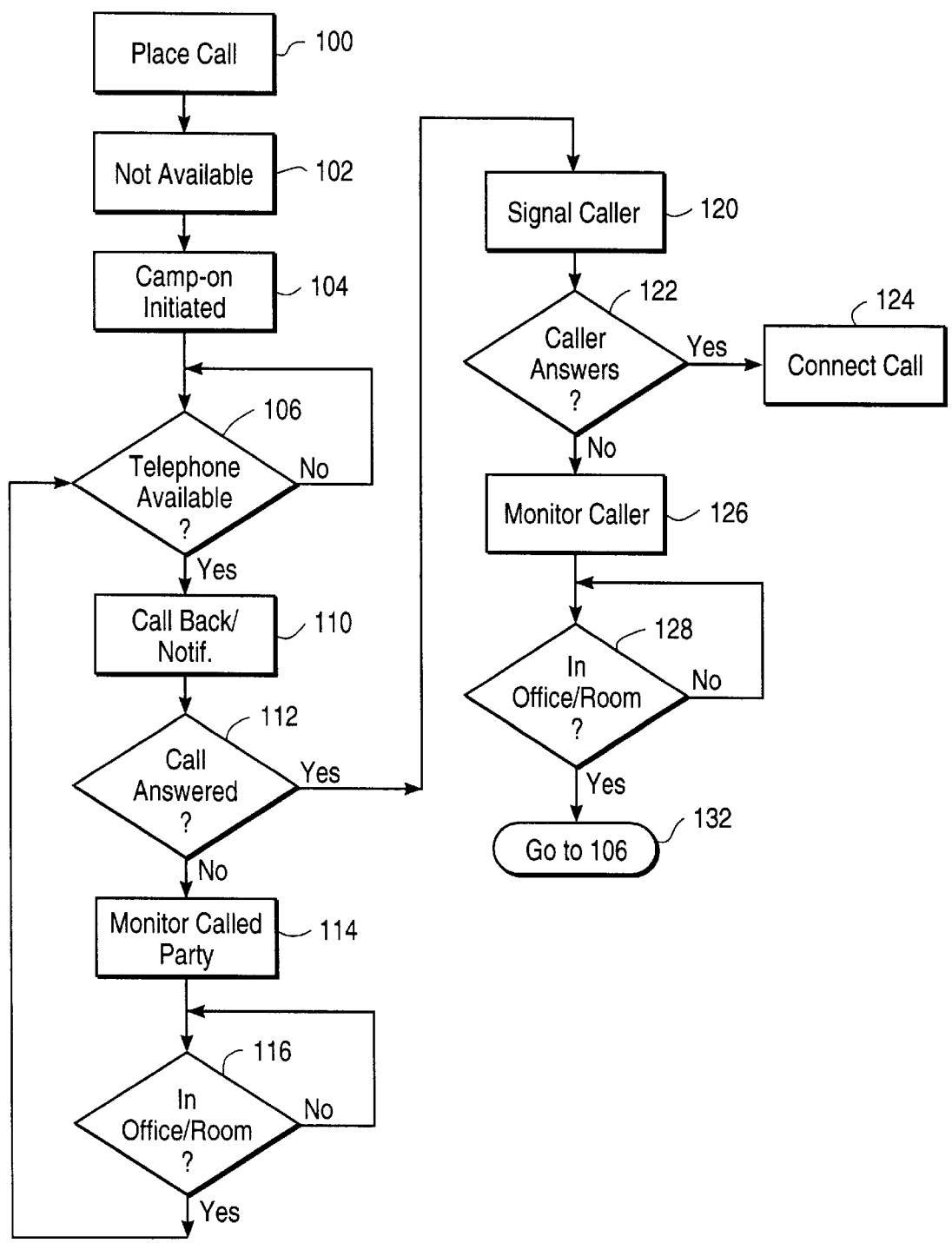
FIG. 2 illustrates a first process flow chart for a first embodiment of the present invention.

FIG. 2 illustrates a first process flow chart for a first embodiment of the present invention. At step 100, a call is placed from the caller to the called party. At step 102, the telecommunication system determines that the called party's telephone is not available and notifies the caller (e.g., a busy signal is provided). At step 104, the caller initiates the camp-on feature. At step 106, the telecommunication system monitors the called party's telephone. If this telephone is in use (e.g., ringing or off-hook), then the telecommunication system continues its monitoring. If the telephone becomes available, the call back to the called party takes place at step 110. At step 112, if the call back is answered, the system moves to step 120. If the call back is not answered, the called party is monitored at step 114. At step 116, the system determines if the called party is in the business office or hotel room. This is preferably done by receiving signals from an electronic door lock system which already monitors when employees/visitors enter their offices/rooms. If the signals indicate the called party is not present the called party is not present, the system continues to receive signals. If the called party is present, the system moves to step 106 to check on the availability of the called party's telephone.

At step 120, the caller is signaled (e.g., with a distinctive ring). If the caller answers the telephone at step 122, then the call is connected at step 124. If the caller does not answer, then the caller may be monitored at step 126. Again, this is preferably done by receiving signals from the caller's electronic door lock system. If the caller is not present, the system continues its monitoring. If the caller is present, the system moves to step 132 which then jumps to step 106.

Figure 3:
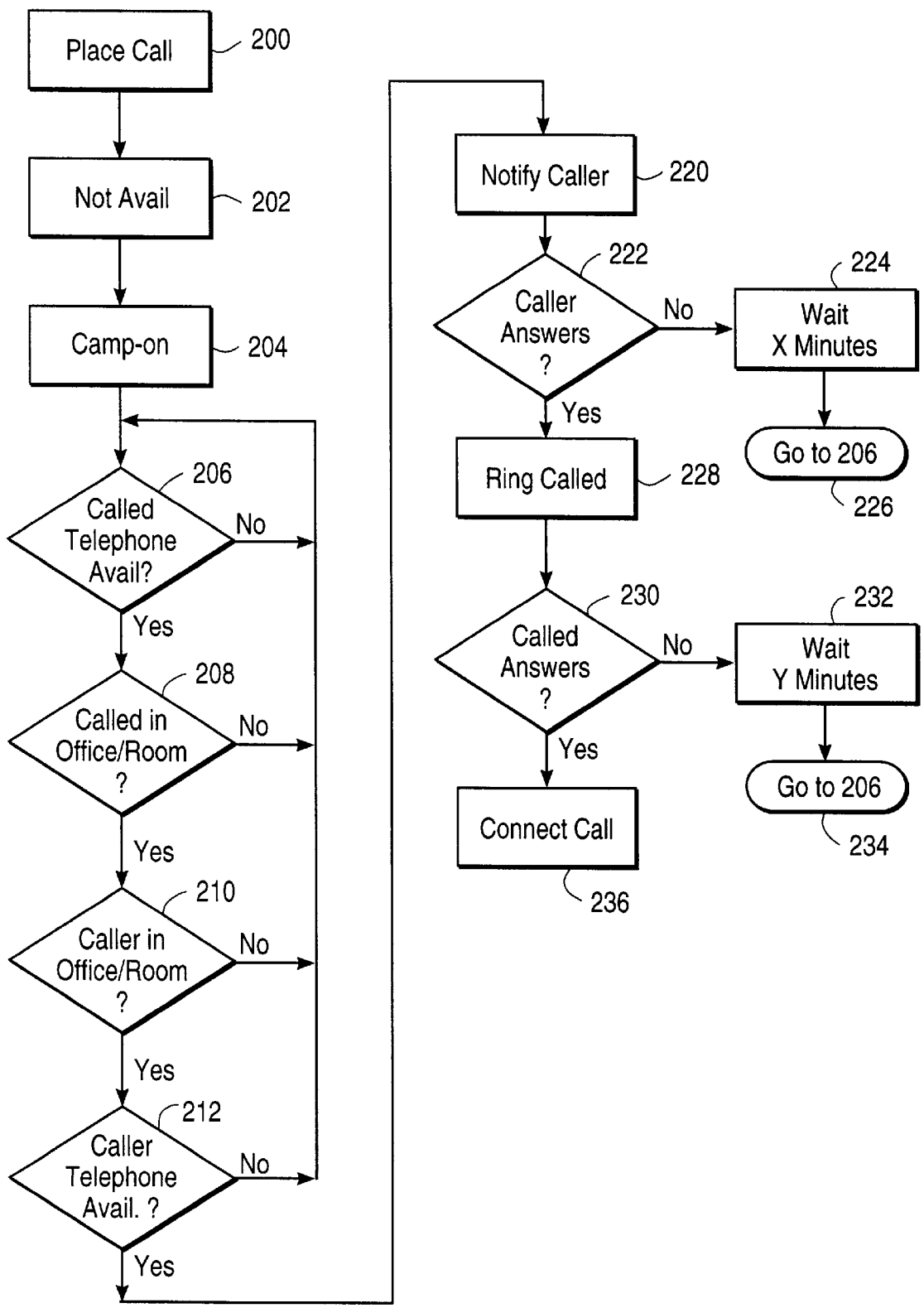
FIG. 3 illustrates a second process flow chart for a second embodiment of the present invention.

FIG. 3 illustrates a second process flow chart for a second embodiment of the present invention. At step 200, the caller places a call. At step 202, the caller is informed that the called party is not available. At step 204, the caller initiates the camp-on feature. The telecommunication system then monitors the following: at step 206, if the called party's telephone is available; at step 208, if the called party is located in her office/room; at step 210, if the caller is in his office/room; and at step 212 if the caller's telephone is available. When all these conditions exist, the system moves to step 220 and notifies the caller. If the caller does not respond at step 222, the system waits a predetermined amount of time (e.g., 10 minutes) at step 224. The system then moves to step 226 which jumps to step 206 to check the previously described conditions again. If the caller does respond to the notification (e.g., by answer his telephone) at step 222, then the system moves to step 228. At step 228, a ring signal is sent to the called party's telephone. If the called party does not answer her telephone at step 230, the system waits a predetermined amount of time at step 232. The system then moves to step 234 which jumps to step 206. If the called party does answer her telephone at step 230, then the call is connected at step 236.

In one embodiment of the invention, the user is provided with a telephone number for changing the system options related to the camp-on feature. This telephone number can be provided, for example, in a company manual or during the hotel check-in procedure. The user can then dial this telephone number and program in a callback time delay such that the user has, for example, five minutes after activating the door lock mechanism before the callback is placed. This telephone number can also be used to avoid disturbing customers/users. The user could, if desired, disable their automatic contacting feature.

Similarly, the telephone number can be used by a caller to provide a camp-on expiration timer. In this situation, the caller can optionally set a time limit or expiration time (e.g., for 3 hours). Thus, a camp-on would only be effective for 3 hours after it is initiated. This setting of a camp-on feature time limit eliminates the possibility of camp-on callbacks occurring during inconvenient hours.

In another embodiment of the present invention, the electrical or mechanical locks are not initially connected to a central computer. In this situation, an electronic card or an electronic key is coded by a security office or business at the hotel's front desk with a code including: 1) the employee's office number or 2) the hotel room number and the dates of the guest's stay, if applicable. The door lock is preprogrammed to accept any card or key with the correct coded office/room number (and dates). The lock is self-contained and sometimes battery operated. Thus, this type of lock does not initially connect to the front desk or to a central computer. To modify this lock for the present invention, the lock is connected to a central computer via a wired or a wireless connection. For example, an electrical wire for transferring electrical signals can be used to connect each lock with the central computer. For a wireless connection, a transmitter is added to the door locks and a receiver to the central computer for transferring wireless signals. In this embodiment, the central computer communicates with the telecommunication system of the present invention.

In another embodiment, the telecommunication system receives signals directly from the door lock mechanism. In this embodiment, the locks are coupled to the telephone line already in the office/room with wires or a wireless connection. If the telephone line is used, dual tone multi-frequency (DTMF) tones or other signals can be transmitted to the telecommunication system to communicate the unlocking of the door with the employee's/guest's card/key. If DTMF tones are used, a special number is utilized to connect the door lock to the telecommunication system. Then, the other relevant data can be sent with more DTMF tones or with any other data transmission standard (e.g., a modem standard).

Additionally, in the hotel example, if multiple users are sharing a room, each user could be checked in separately and given a different electronic card/key which refers to that user's telecommunication system extension. In this example, each guest has a separate telecommunication system extension even if they share a room with other guests. The door lock system then provides more detailed information to the telecommunication system such that the telecommunication system can monitor when each individual guest is provided access to the hotel room. This information can then be used by the present invention to even further increase the chances of connecting a call. In particular, when attempting to contact a guest who is sharing a room with other guests, only the entrance of the called guest causes the camp-on feature to attempt to connect the call.

In another embodiment, the present invention is used in a telecommuting center environment. A telecommuting center is used when multiple individuals share one office or work space. For example, several salespeople who are usually on the road may be able to share the same office. One employee may use the office from 9 a.m. to 11 a.m., while another employee is there from 12 noon to 2 p.m., etc.

With the present invention, electronic keys can be used for identifying each of the salespeople using a telecommuting center. After a salesperson has been identified, the present invention can begin the process for connecting any initiated camp-on features for that identified salesperson. More particularly, after the central computer identifies the individual using the shared office, the central computer can allow the identified user to be contacted through the common telephone. For example, the identified user's telephone extension would ring on the common telephone. Optionally, the user could utilize the electronic key when exiting the shared office to both (1) lock the door and (2) indicate that the user was vacating the area. Thus, when the user's extension is called, the user's telecommunication system would not ring the common telephone after the user had left the shared office.

In another arrangement of this embodiment, the electronic key could work in a wireless fashion to indicate to the central computer when a user enters and/or exits a shared office. In this arrangement, the user would not need to insert or swipe the electronic key. Just having the key in a pocket or purse and entering or leaving a signal receiving area would be enough to indicate the user's presence or absence. For example, a signal receiver located in the shared office could receive user identification information transmitted from the electronic key and then transfer that information to the central computer. In this example, when a transmission from the electronic key occurs, information is sent to the central computer indicating that the user entered or left the shared office. In this example, the central computer can monitor a user's location at all times and initiate a callback whenever a called party is near a system telephone. This can be done completely independent of any entry or door lock system.

In yet another embodiment of the present invention, time-limit parameters can be provided such that a called party will not receive a camp-on callback at inconvenient or off-hours. For example, the time-limit parameters can be used to prevent camp-on callbacks during regular sleeping hours. This situation may occur if the caller and the called party are in different time-zones. A configurable timer can also be provided to the user such that the user can control when camp-on callbacks are restricted.

The present invention can be expanded to cover other telecommunication system features such as automatic conference calling. For example, a user can request a conference call among multiple users (e.g., five users). The telecommunication system then sets up the conference call when all of the users are present. This type of conference can be setup on a one-time basis, or it can be stored for repeated use. As with the camp-on feature, a software change along with the input signal from an electronic door lock system are used for implementation.

The present invention can also be used to set up live telephone calls on a data network, the Internet, etc. This is particularly helpful for teleconferences when the participants are difficult to contact. In addition to telephone calls, the present invention works equally well for video or any other type of multimedia call.

Currently, there are some electronic door lock systems where the key remains inserted when you enter a room. This is used, for example, to control the lighting in a room such that energy is conserved. This is usually present in countries with strict environmental regulations that concentrate on energy conservation. When this system is used, the location of the key indicates the presence or absence of the user. This arrangement works well as an indicator to the central computer in the present invention. Thus, any electronic system indicating information related to a user's location can be used in the present invention.

What is claimed is:

1. A system for integrating an electronic lock system with a telecommunication system, the integrating improving a telecommunication feature, comprising:

an electronic lock system installed at a location and configured to trnasmit a signal indicating information related to the location and detecting a person's presence at the location; and a telecommunication system configured to receive the signal from the electronic lock system, the telecommunication system further being configured to provide the telecommunication features, and the telecommunication system using the signal from the electronic lock system as input to the telecommunication feature.

2. The system for integrating an electronic lock system with a telecommunication system of claim 1, wherein the signal detecting the person is transmitted when the person receives access from the electronic lock system.

3. The system for integrating an electronic lock system with a telecommunication system of claim 1, wherein the telecommunication feature is a camp-on feature, and wherein the telecommunication system attempts to contact the user after the signal from the electronic lock system is received by the telecommunication system.

4. The system for integrating an electronic lock system with a telecommunication system of claim 3, wherein a call back for the camp-on feature is placed based on the transmitted signal from the electronic lock system.

5. The system for integrating an electronic lock system with a telecommunication system of claim 1, further comprising a second electronic system capable of transmitting a second signal indicating information related to a location of a second person, and the telecommunication system using the second signal from the second electronic system as another input to the telecommunication feature.

6. The system for integrating an electronic lock system with a telecommunication system of claim 1, wherein the signal is transmitted from the electronic lock system to the telecommunication system via a wireless connection.

7. The system for integrating an electronic lock system with a telecommunication system of claim 1, wherein the electronic system and the telecommunication system are in at least one of a business environment and a hotel environment, and the electronic lock system is an electronic entry system.

8. The system for integrating an electronic lock system with a telecommuncation system of claim 1, wherein the telecommunication feature includes a configurable time delay.

9. The system for integrating an electronic system with a telecommunication system of claim 1, wherein the telecommunication feature includes time-limit parameters.

10. The system for integrating an electronic system with a telecommunication system of claim 1, wherein the telecommunication feature is an automatic conference calling feature.

11. A method for integrating an electronic lock system with a telecommunication system, comprising the steps of:

transmitting a signal from an electronic lock system installed at a location, the signal indicating the presence of a user at the location;

receiving the signal by a telecommunication system, the telecommunication system being configured to provide a telecommunication feature; and using the signal from the electronic lock system as an input to the telecommunication feature.

12. A method for integrating an electronic lock system with a telecommunication system of claim 11, wherein the telecommunication feature is a camp-on feature.

13. A method for integrating an electronic lock system with a telecommunication system of claim 11, wherein the telecommunication feature is a camp-on feature, and wherein the telecommunication system attempts to contact the user after the signal from the electronic lock system is received by the telecommunication system.

14. A method for integrating an electronic lock system with a telecommunication system of claim 13, wherein a call back for the camp-on feature is placed based on the transmitted signal from the electronic lock system.

15. A method for integrating an electronic lock system with a telecommunication system of claim 11, further comprising the steps of:

transmitting a second signal from a second electronic system, the signal indicating information related to a location of a second user;

using the second signal as another input to the telecommunication feature.

16. A method for integrating an electronic lock system with a telecommunication system of claim 15, wherein the telecommunication feature is a camp-on feature.

17. A method for integrating an electronic lock system with a telecommunication system of claim 16, wherein the user is a called party and the second user is a caller.

18. A method for integrating electronic lock system with a telecommunication system of claim 11, wherein the telecommunication feature is an automatic conference calling feature.

19. A system for integrating an electronic system with a telecommunication system, the integrating improving camp-on within the telecommunication system, comprising:

an electronic lock system installed at a location and configured to transmit a signal indicating information related to the location and detecting a person's presence at the location; and a telecommunication system configured to receive the signal from the electronic system, the telecommunication system further being configured to provide a telephone camp-on feature, and the telecommunication system using the signal from the electronic system as input to the camp-on feature wherein the telecommunication system attempts to contact the person after the signal from the electronic system is received by the telecommunication system.

20. A method for integrating an electronic system with a telecommunication system, comprising the steps of:

transmitting a signal from an electronic system, the signal indicating information related to a location of a user;

receiving the signal with a telecommunication system, the telecommunication system being configured to provide a camp-on telecommunication feature; and using the signal from the electronic system as an input to the camp-on telecommunication feature, wherein a call back for the camp-on feature is placed based on the transmitted signal from the electronic system.

* * * * *